United States Patent [19]
Abe et al.

[11] Patent Number: 5,451,426
[45] Date of Patent: Sep. 19, 1995

[54] METHOD FOR FORMATION OF BARIUM TITANATE FILM

[75] Inventors: Yoshio Abe, Kyoto; Hiroshi Takagi, Ohtsu; Yukio Sakabe, Kyoto, all of Japan

[73] Assignee: Murata Mfg. Co., Ltd., Japan

[21] Appl. No.: 44,974

[22] Filed: Apr. 8, 1993

[30] Foreign Application Priority Data

Apr. 10, 1992 [JP] Japan ................... 4-090742

[51] Int. Cl.⁶ ............................ B05D 1/18; B05D 5/12
[52] U.S. Cl. ........................ 427/126.3; 427/430.1; 427/435; 427/443.2; 501/137
[58] Field of Search .......... 427/126.1, 430.1, 126.2, 427/435, 443.2, 126.3; 501/137

[56] References Cited

U.S. PATENT DOCUMENTS

| | | | |
|---|---|---|---|
| 2,922,730 | 1/1960 | Feldman | 427/126.2 |
| 3,002,861 | 10/1961 | Suchoff | 427/126.2 |
| 4,587,041 | 5/1986 | Uedaira | 427/126.1 |
| 4,959,089 | 9/1990 | Bhargava | 427/126.2 |
| 5,160,762 | 11/1992 | Brand | 427/126.2 |
| 5,328,718 | 7/1994 | Abe et al. | 427/126.3 |

FOREIGN PATENT DOCUMENTS

| | | |
|---|---|---|
| 0297646 | 6/1988 | European Pat. Off. |
| 61-30678 | 2/1986 | Japan |
| 2-94209 | 4/1990 | Japan |
| 2-258700 | 10/1990 | Japan |

OTHER PUBLICATIONS

Patent Abstracts of Japan, JP-A-50 85 728, Murata Mfg., Abstract, Apr. 1993.
Patent Abstracts of Japan, JP-A-43 62 015, Mitsubishi Materials Corp., Dec. 1992.
Patent Abstracts of Japan, JP-A-12 86 922, Toray Ind. Inc., Abstract, Nov. 1989.

*Primary Examiner*—Roy V. King
*Attorney, Agent, or Firm*—Osterlenk, Faber, Gerb & Soffen

[57] ABSTRACT

A thin film of barium titanate is formed on a substrate by immersing a substrate in an aqueous solution containing titanium ions along with a glass substance mainly comprising barium oxide and silicon dioxide. In the solution, barium ions are eluted from the glass substance with the solution to react with titanium ions in the solution to deposit barium titanate on the substrate.

12 Claims, 1 Drawing Sheet

METHOD FOR FORMATION OF BARIUM TITANATE FILM

BACKGROUND OF THE INVENTION

1. Field of the invention

The present invention relates to a method for formation of barium titanate film and, more particularly, a method for forming thin films of barium titanate on substrates.

2. Description of the prior art

Barium titanate, BaTiO$_3$, has widely been used as a material for various electronic parts such as, for example, capacitors, resonators and the like. In order to apply barium titanate to such electronic parts, it is required to form thin films of barium titanate on substrates having various shapes and properties. To this end, there have been proposed various methods for fabrication of barium titanate thin films. For example, JP-A- 61-30678 discloses a method for formation of barium titanate thin films, employing chemical treatment of a surface of metallic titanium. JP-A- 02-94209 discloses a method for formation of barium titanate thin films, employing sputtering in which materials for barium titanate are sputtered from a cathode in electrical gas discharges. JP-A-H2-258700 discloses a method for formation of barium titanate thin films, utilizing plasma vapor deposition.

However, the above methods include various problems awaiting a solution. In the method disclosed in JP-A- 61-30678, the substrate is limited only to metallic titanium, thus making it impossible with this method to form thin films of barium titanate on substrates other than metallic titanium. In the method disclosed in JP-A- 02-94209, sputtering requires use of complex and expensive equipments, resulting in considerable increase of equipment investment. In the method disclosed in JP-A- 02-258700, discloses a plasma method utilizing plasma for deposition of thin films. This method requires complex and expensive equipments and can be applied only to substrates which can stand high temperatures, resulting in limitation of materials used for substrates.

SUMMARY OF THE INVENTION

It is therefore an object of the present invention to provide a method for formation of barium titanate thin films, which overcomes the aforesaid disadvantages of the prior art.

Another object of the present invention is to provide a method for formation of barium titanate thin films, which makes it possible to form thin films of barium titanate on any desired substrates without use of complex and expensive equipments.

The above and other objects of the present invention are achieved by providing a method for formation of barium titanate film, comprising the steps of:
 preparing an aqueous solution containing titanium ions;
 preparing a glass substance mainly comprising barium oxide and silicon dioxide;
 immersing said glass substance along with a substrate in said aqueous solution to deposit barium titanate on the substrate by allowing barium ions eluted from said glass substance with said aqueous solution to react with titanium ions in the solution.

As a glass substance serving as a source of barium ions, there may be used those containing barium oxide in an amount of 50 mole percent or below. The glass substance may have a composition consisting of barium oxide and silicon dioxide, or a composition mainly comprising barium oxide and silicon dioxide and further including additives such as titanium oxide. In any cases, however, the content of barium oxide should be less than or equal to 50 mole %. Because, the content of barium oxide exceeding 50 mole % makes it impossible to make the composition into a glass substance.

Preferably, the glass substance is arranged close to the substrate in face-to-face relationship to promote thin formation of barium titanate. In this case, it is preferred to use a glass substance in the form of a plate to make it easy to handle. However, it is also possible to use a plurality of glass beads as a source of barium ions instead of the glass plate.

It is preferred to adjust the aqueous solution to pH 13 or above. If the pH value of the aqueous solution is less than 13, undesired phases other than barium titanate are produced during film formation. The pH of the solution is adjusted by addition of an aqueous solution of alkali such as sodium hydroxide, potassium hydroxide, ammonium hydroxide and the like.

As a source of titanium ions, there may be used those such as titanium alkoxides or derivatives thereof. Titanium alkoxides include, without being limited to, titanium butoxide, titanium ethoxide, titanium propoxide and the like. The derivatives of titanium alkoxide include alkanolamine-modified titanium alkoxides i.e., titanium alkoxides modified by one or more alkanolamines of the general formula: HO(C$_n$H$_{2n}$)$_m$NH$_{3-m}$ where n is an integer of 10 or below, and m is an integer of 1, 2 or 3. The alkanolamines includes, without being limited to, ethanolamines, propanolamines, butanolamines, etc.

Preferably, the aqueous solution is maintained at a temperature ranging from 50° to 90° C. during film formation of barium titanate. If the temperature of aqueous solution is less than 50° C., a reaction product having a composition close to that of barium titanate is formed. However, this product is an amorphous compound, thus making it impossible to produce ferroelectric thin films of barium titanate having a perovskite crystal structure. On the other hand, if the temperature of aqueous solution is more than 90° C., the solution generates bubbles which adhere to the surface of the substrate to prevent it from deposition of thin films of barium titanate.

By immersing the glass into the aqueous solution, barium ions are eluted from the glass with the solution. Under the suitable reaction conditions such as an elution rate of barium ions, pH of the solution and a temperature of the solution, barium ions react with titanium ions to form barium titanate, which in turn results in formation of thin films of barium titanate on surfaces of the substrate and glass.

Thus, the present invention makes it possible to deposit thin films of barium titanate on the substrates only by immersing the substrate in the aqueous solution.

The present invention will become apparent from the following description with reference to the accompanying drawing, which shows by way of example only, a preferred embodiment thereof.

EXAMPLE 1

Figure 1:
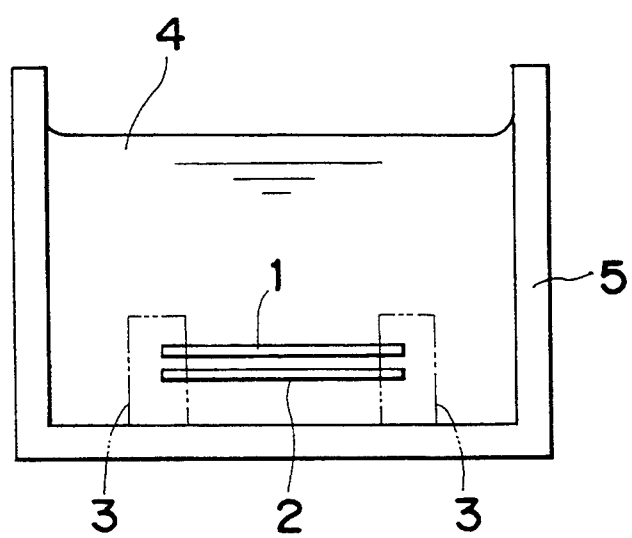
FIG. 1 is a schematic view of a reaction system used in a method for formation of barium titanate film according to the present invention.

Barium carbonate (BaCO$_3$) and silicon dioxide (SiO$_2$) were weighed and mixed to prepare several kinds of barium ion sources composed of a glass having a composition as shown in Table 1. The resultant mixture was placed in a platinum crucible, heated at 1500° C. for 1 hour to form a glass melt, spread over an iron plate and then pressed against the iron plate with another iron plate to form a glass plate with a thickness of 1 mm. The resultant glass plate was cut into square segments of 10 mm long and 10 mm wide.

TABLE 1

| Glass No. | Composition (mole %) | |
|---|---|---|
| | BaO | SiO$_2$ |
| 1 | 1 | 99 |
| 2 | 10 | 90 |
| 3 | 20 | 80 |
| 4 | 30 | 70 |
| 5 | 40 | 60 |
| 6 | 50 | 50 |

Separate from the above, there were prepared various substrates of 10 mm long and 10 mm wide, using a sintered alumina, gold, silver, polymethyl methacrylate and polyethylene.

On the other hand, there was prepared a titanium-containing solution by mixing 100 parts by volume of tenth normal (10N) sodium hydroxide solution with 2 parts by volume of isopropyl alcohol containing 0.4 percent by volume of titanium tetraisopropoxide dissolved therein. The resultant titanium-containing solution (30 ml) was placed in a reaction vessel 5 as shown in FIG. 1, and then heated to a temperature of 80° C. The solution was adjusted to pH 12 by addition of sodium hydroxide solution.

The above glass segment 1 and substrate 2 were fixed a pair of supporting members 3 with a separation, distance of 0.5 mm, immersed in the titanium-containing solution 4 maintained at 80° C., and then allowed to stand for 3 days at that temperature to form a thin film of barium titanate thereon. After that, the substrate 2 was taken out of the solution 4 and observed as to the existence of a thin film of barium titanate.

For all the specimens, it was observed that a uniform thin film of barium titanate is deposited on one substrate surface being faced toward the glass segment during film formation.

EXAMPLE 2

Barium carbonate (BaCO$_3$), silicon dioxide (SiO$_2$) and titanium dioxide were weighed and mixed to prepare several kinds of barium ion sources composed of a glass having a composition as shown in Table 2. The resultant mixture was placed in a platinum crucible, heated at 1500° C. for 1 hour to form a glass melt, spread over an iron plate, and then pressed against the iron plate with another iron plate to form a glass plate with a thickness of 1 mm. The resultant glass plate was cut into square segments of 10 mm long and 10 mm wide.

TABLE 2

| Glass No. | Glass Composition (mole %) | | |
|---|---|---|---|
| | BaO | SiO$_2$ | TiO$_2$ |
| 7 | 10 | 85 | 5 |
| 8 | 20 | 70 | 10 |
| 9 | 30 | 60 | 10 |
| 10 | 40 | 50 | 10 |

Using sintered alumina, gold, silver, polymethyl methacrylate and polyethylene, there were prepared various kinds of substrates of 10 mm long and 10 mm wide in the same manner as that in Example 1.

On the other hand, there was prepared a titanium-containing solution by mixing 100 parts by volume of ten normal (10N) aqueous solution of sodium hydroxide with 2 parts by volume of an aqueous solution of titanium tetrachloride (diluted with water to one-thousand). The resultant titanium-containing solution (30 ml) was placed in a reaction vessel 5 as shown in FIG. 1.

The above glass segment 1 and substrate 2 were immersed in 30 ml of the titanium-containing solution in a reaction vessel 5 and allowed to stand for 3 days at 50° C. to form a thin film of barium titanate in the same manner as Example 1. After being taken out of the solution 4, the substrate 2 was observed as to the existence of a thin film of barium titanate.

For all the specimens, it was observed that a uniform thin film of barium titanate is deposited on one surface of the substrate being faced toward the glass segment.

In the above examples, there have been used sintered alumina, gold, silver, polymethyl methacrylate and polyethylene as a material for substrates of barium titanate films. However, any other materials may be used as a substrate for barium titanate films.

As will be understood from the above, according to the present invention, barium titanate thin films can be produced only by immersing the substrate in the solution, thus making it possible to produce uniform thin films of barium titanate on any desired substrate.

Further, since the barium titanate thin films can be directly deposited on the substrate surface, it is possible to select a material and configuration of substrates from wide ranges, which in turn makes it possible to expand the area of applications of barium titanate thin films.

Although the present invention has been fully described in connection with the preferred examples, it is to be noted that various changes and modifications, which are apparent to those skilled in the art, are to be understood as included within the scope of the present invention as defined by the appended claims unless they depart therefrom.

What is claimed is:

1. A method for formation of barium titanate film comprising the step of immersing a substrate in an aqueous solution of at least one titanium compound along with a glass substance predominantly comprising barium oxide and silicon dioxide to deposit barium titanate on the substrate by allowing barium ions eluted from the glass substance into the aqueous solution to react with titanium ions in the solution.

2. The method claimed in claim 1 wherein said glass substance and said substrate are arranged close to one another in face-to-face relationship.

3. The method claimed in claim 1 wherein a content of barium oxide in said glass substance is 50 mole % or below.

4. The method claimed in claim 1 wherein said solution is an alkaline solution with pH 13 or above.

5. The method claimed in claim 1 wherein said solution is maintained at a temperature of 50° to 90° C. during film formation.

6. The method claimed in claim 1 wherein said aqueous solution is prepared by dissolving at least one titanium compound in water, said titanium compound being at least one compound selected from the group consisting of titanium alkoxides and alkanolamine-modified titanium alkoxides.

7. A method for formation of barium titanate film, comprising the steps of:
   preparing an aqueous solution containing titanium ions;
   preparing a glass substance mainly comprising barium oxide and silicon dioxide;
   immersing said glass substance along with a substrate into said aqueous solution to deposit barium titanate on the substrate by allowing barium ions eluted from said glass substance into said aqueous solution to react with titanium ions in the solution.

8. The method claimed in claim 7, wherein said aqueous solution is prepared by dissolving at least one titanium compound selected from the group consisting of titanium alkoxides and alkanolamine-modified titanium alkoxides in water.

9. The method claimed in claim 7, wherein said titanium compound is titanium alkoxide.

10. The method claimed in claim 7, wherein said titanium compound is titanium alkoxide modified by alkanolamine.

11. The method claimed in claim 7, wherein said titanium compound is titanium alkoxide modified by alkanolamine of the general formula: $HO(C_nH_{2n})_mNH_{3-m}$ where n is an integer less than or equal to 10, and m is an integer of 1, 2 or 3.

12. The method claimed in claim 7, wherein said substrate is selected from the group consisting of sintered alumina, gold, silver, polymethyl, methacrylate and polyethylene.

* * * * *